United States Patent
Mayer et al.

[11] Patent Number: 6,032,648
[45] Date of Patent: Mar. 7, 2000

[54] METHOD OF CONTROLLING IGNITION IN A MULTICYLINDER INTERNAL COMBUSTION ENGINE

[75] Inventors: Ulrich Mayer, Waiblingen; Peter Kaltenbrunn; Thomas Edelmann, both of Bietigheim-Bissingen, all of Germany

[73] Assignee: Robert Bosch GmbH, Stuttgart, Germany

[21] Appl. No.: 09/101,607

[22] PCT Filed: Dec. 6, 1996

[86] PCT No.: PCT/DE96/02343

§ 371 Date: Oct. 2, 1998

§ 102(e) Date: Oct. 2, 1998

[87] PCT Pub. No.: WO97/26522

PCT Pub. Date: Jul. 24, 1997

[30] Foreign Application Priority Data

Jan. 18, 1996 [DE] Germany .................. 196 01 593

[51] Int. Cl.[7] .................. G01M 15/00; F02P 5/00
[52] U.S. Cl. .................. 123/406.14; 123/406.27
[58] Field of Search .................. 123/406.14, 406.16, 123/406.27, 406.24

[56] References Cited

U.S. PATENT DOCUMENTS

| | | |
|---|---|---|
| 5,119,783 | 6/1992 | Kamurasaki . |
| 5,201,293 | 4/1993 | Langner et al. . |
| 5,241,937 | 9/1993 | Kanehiro et al. .................. 123/406.27 |
| 5,327,867 | 7/1994 | Hisaki et al. .................. 123/406.14 |
| 5,559,285 | 9/1996 | Bryant et al. .................. 123/406.27 |
| 5,598,821 | 2/1997 | Terata et al. .................. 123/406.27 |
| 5,606,120 | 2/1997 | Daicho et al. .................. 123/406.27 |

FOREIGN PATENT DOCUMENTS

| | | |
|---|---|---|
| 611882 | 8/1994 | European Pat. Off. . |
| 40 35 958 | 5/1992 | Germany . |
| 42 27 104 | 3/1993 | Germany . |
| 44 35 654 | 4/1995 | Germany . |

*Primary Examiner*—Erick R. Solis
*Attorney, Agent, or Firm*—Kenyon & Kenyon

[57] ABSTRACT

A method for controlling ignition in a multi-cylinder internal combustion engine, such that the control variables are determined on the basis of the parameters sensed by sensors, and such that after output of the control variables, a misfire monitoring operation is performed. After output of an ignition signal, the torque of the combustion event initiated by the ignition event is sensed and compared with an average of the torques of previous combustion events. If, in this context, a deviation of the currently sensed torque from the average of the torques of a definable number of previous combustion events which is greater than a definable threshold occurs, the misfire detection system is switched to inactive status.

3 Claims, 3 Drawing Sheets

METHOD OF CONTROLLING IGNITION IN A MULTICYLINDER INTERNAL COMBUSTION ENGINE

FIELD OF THE INVENTION

The present invention relates to a method for controlling ignition in a multi-cylinder internal combustion engine having an integrated misfire detection system. An ignition system for internal combustion engines in which the rotation speed of the crankshaft is monitored in a control device, on the basis of a plurality of marks on a rotation speed pickup wheel and at high resolution, by means of a sensor. After each ignition event has occurred, a previously sensed and averaged rotation speed value is compared, in a control circuit, with the instantaneous rotation speed value. In the event of a decrease in rotation speed or if positive acceleration is absent, an ignition misfire is detected.

SUMMARY OF THE INVENTION

The ignition system according to the present invention, includes an improved misfire detection system for a multi-cylinder internal combustion engine. By forming an average torque value over a definable number of previous combustion events, an evaluation can be made as to whether the current combustion event to be evaluated deviates greatly from that average, and in the event of such a deviation the misfire detection system can be switched to inactive status so that a misfire is not incorrectly detected. This ensures that a torque surge due to an adjustment in ignition angle does not result in detection of a misfire.

In an exemplary embodiment of the present invention, the plausibility of the deviation from the average of the torque of the combustion event being evaluated is examined. This tests whether said deviation has occurred as a result of the control variable that was output. It is also advantageous to limit changes in ignition angle—which occur, for example, as a result of a knock control system or the application of a dynamic lead—to a definable ignition angle change band. As a result, large torque surges between one combustion event and another are avoided, and the misfire detection system can remain active. If an unequivocal deviation in the torque values occurs despite the limitation on ignition angle change, it may be concluded that there is a system fault.

DETAILED DESCRIPTION

Figure 1:
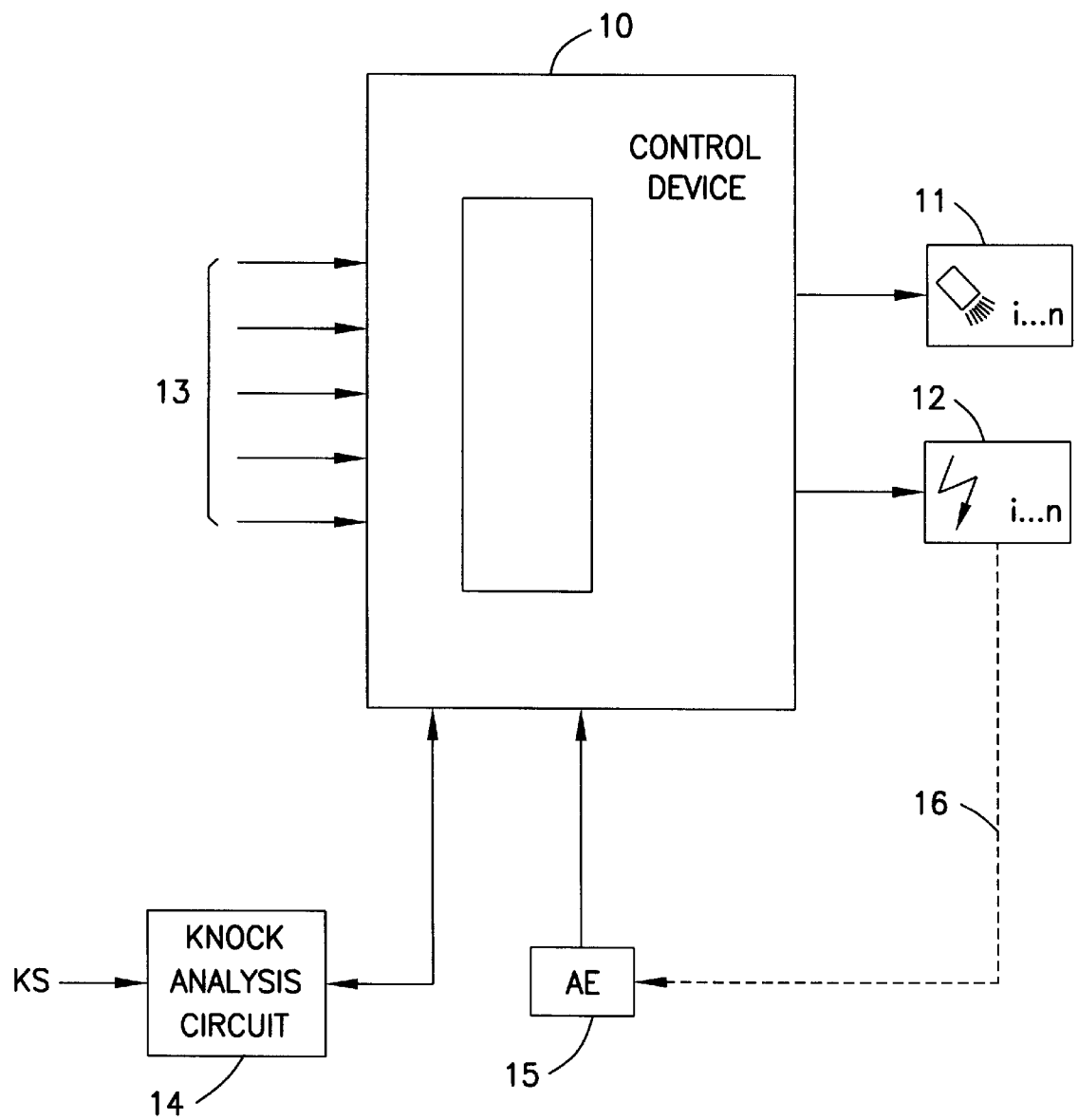
FIG. 1 illustrates an exemplary embodiment of the ignition system of the present invention.

FIG. 1 shows the basic layout of an ignition system, in which the parameters of an internal combustion engine, sensed by sensors (not depicted), are conveyed as input variables 13 to a control device 10 which controls fuel injection 11 and ignition 12 in the individual cylinders of the internal combustion engine. A knock sensor KS senses engine noises and conveys them to a knock analysis circuit 14 which then forwards a signal to control device 10. Information is therefore available in control device 10 as to whether a knocking or non-knocking combustion event has taken place. In addition, a misfire detection stage 15 is connected to the control device. The misfire detection stage 15 is connected to the individual cylinders of the internal combustion, the connection 16 being depicted here as a dashed line. Numerous varieties of misfire detection system exist. For example, a rough-running process can be performed, monitoring of the ignition voltage transformed on the primary side can be undertaken, or the spark duration can be analyzed. Each of these possibilities for misfire detection is conventional, and will not be explained here in detail. The misfire detection system is therefore depicted in FIG. 1 only as a block, and connection 16 depicts the fact that such a connection to the misfire detection system exists.

Figure 2:
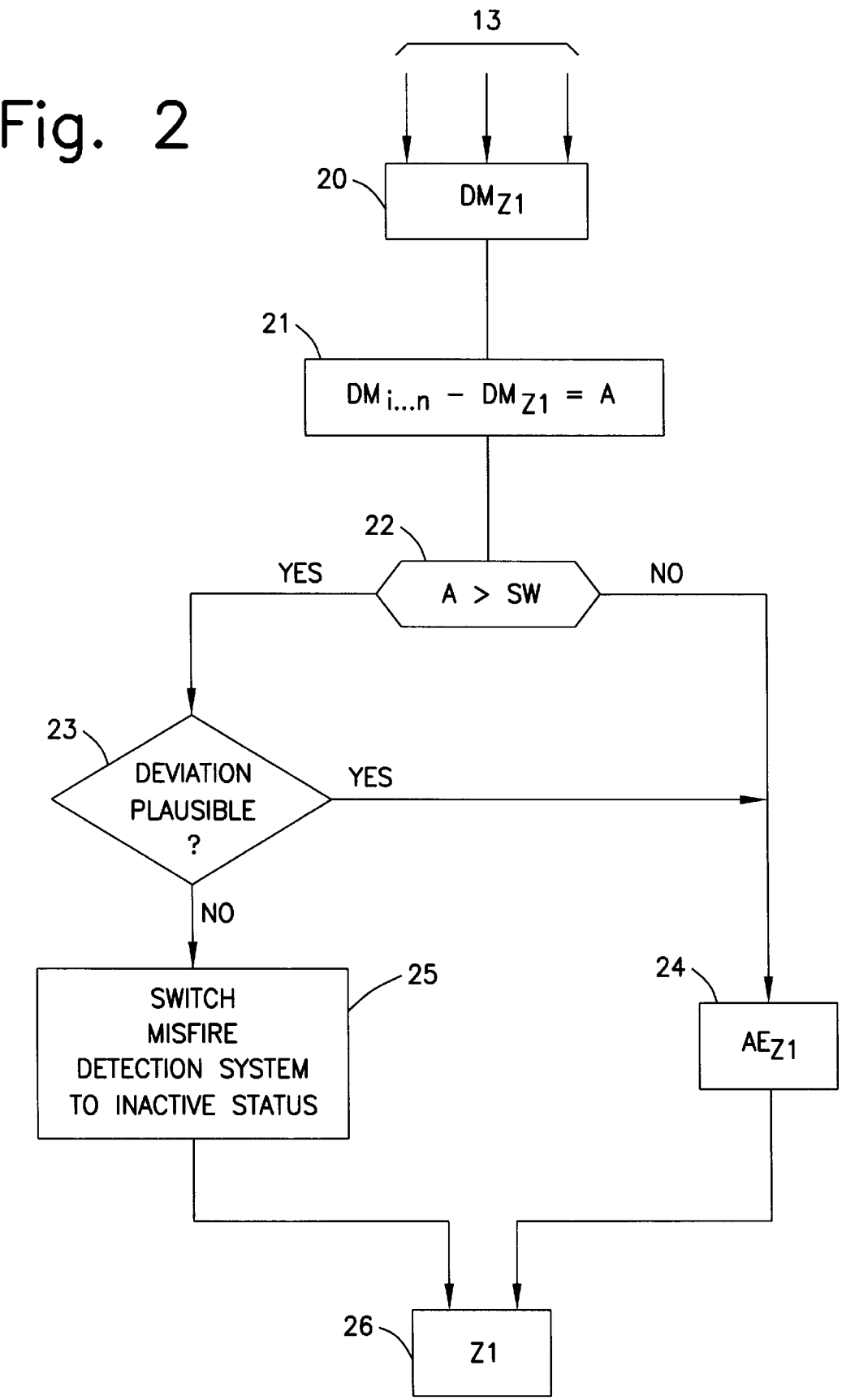
FIG. 2 is a flowchart of an exemplary method in accordance with the present invention.

FIG. 2 depicts the principle of the method according to the present invention. In a first step 20, after a combustion event, the torque $DM_{Z1}$ of the internal combustion engine is determined from the variables that were sensed; cylinder Z1 was selected here for illustration. This instantaneously determined torque $DM_{Z1}$ is then compared with the average torque of all cylinders $DM_{i-n}$, by forming the difference $A=DM_{i-n}-DM_{Z1}$ in step 21. If the difference A is found, in a subsequent query 22, to be greater than a definable threshold value, a check is then made in a query 23 as to whether this deviation is plausible. In other words, a check is made as to whether this modification in the torque of cylinder Z1 has occurred on the basis of modified control signals for fuel injection and ignition. If this deviation was plausible in the context of the control variables that were output, misfire recognition is then performed for that cylinder Z1 in a step 24. If the torque deviation was not plausible, then in step 25 the misfire detection system is switched to inactive status. Execution then jumps back in step 26, and the next cylinder to undergo ignition (in this case cylinder Z2) is analyzed.

In multi-cylinder internal combustion engines having a large number of cylinders, for example eight or twelve cylinders, the cylinders are often divided into two cylinder banks and a control device is then provided for each cylinder bank. In a twelve-cylinder internal combustion engine, six cylinders are therefore activated by a first control device, and six cylinders by a second one. Each of these control devices thus separately controls operation of the pertinent cylinder bank, on the basis of the operating parameters. The two control devices can be interconnected via a data bus and thus exchange information with one another. Each cylinder bank is, however, controlled substantially independently by a control device. In the interest of driving comfort, it is essential in such cases that approximately the same power conversion take place in the two cylinder banks. Great differences in torque occur between the two cylinder banks, is considered a system fault. This may be caused by a different charge or different ignition timing in one the bank. If the engine torque values of the bank averages differ by a magnitude which is greater than a definable threshold, this is recorded in the control device as a fault. Because of this difference in engine torques, misfire detection based on an analysis of torque or rough running cannot be assured, and the misfire detection system is blanked out for that case.

Figure 3:
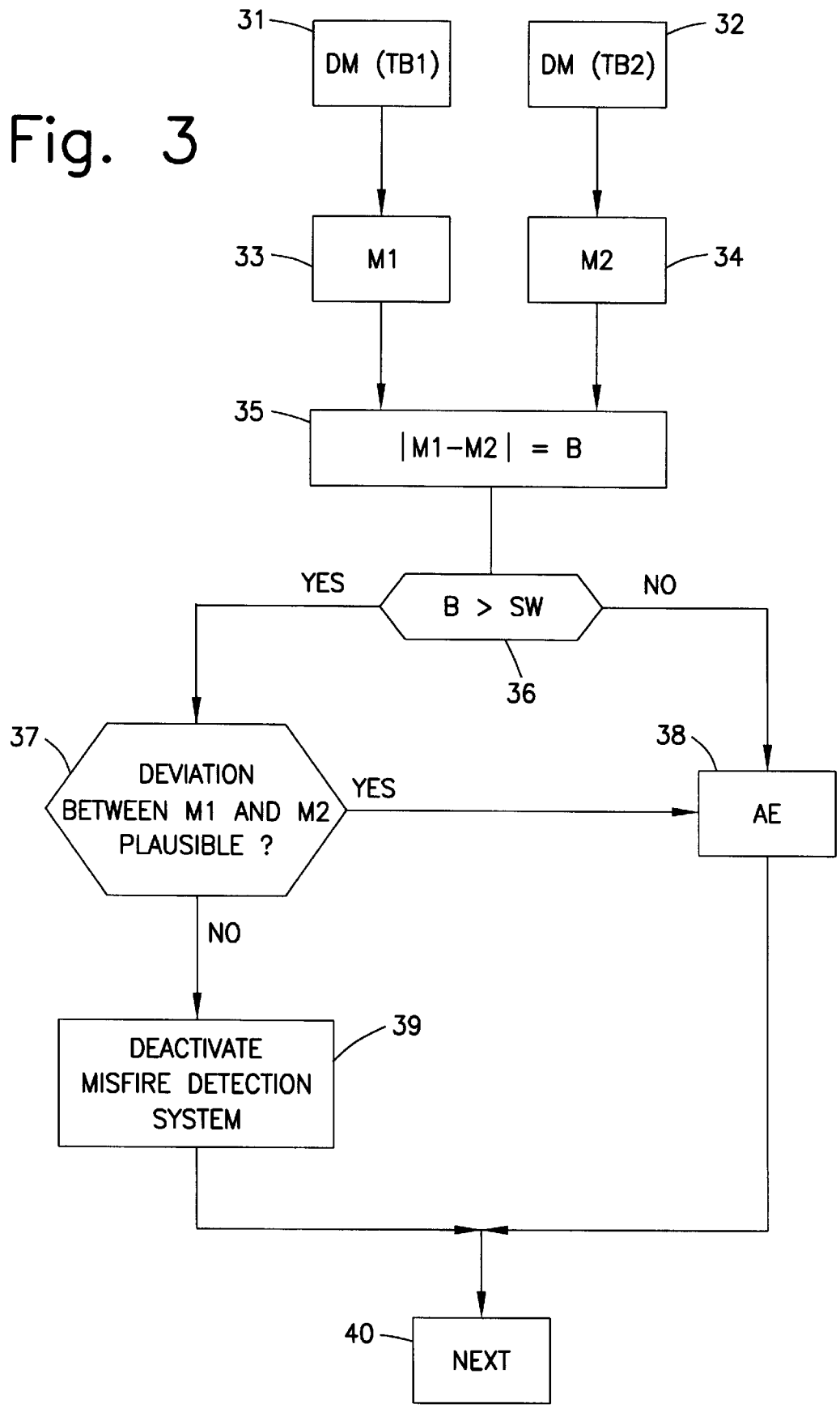
FIG. 3 is a flowchart of an exemplary method, for a large number of cylinders, in accordance with the present invention.

FIG. 3 shows how the torque values of the different cylinder banks are analyzed. This is fundamentally similar to the method in FIG. 2. For simplicity's sake, the individual cylinder banks are differentiated into a first cylinder bank ZB1 and second cylinder bank ZB2. The torque values for the cylinders of first cylinder bank ZB1 are determined in a step 31, and the torque values for the cylinders of second cylinder bank ZB2 in a step 32. The respective bank averages of the torque values are then defined in steps 33 and 34, the average Ml of the torques for the cylinders of the first cylinder bank being calculated in step 33, and the average M2 of the torques for the cylinders of second cylinder bank ZB2 being calculated in step 34. The difference B between the two averages Ml and M2 is then determined in a subsequent step 35. In a subsequent query 36, said difference B is compared with a definable threshold value SW. If the difference B is greater than threshold value SW, a check is then made in a subsequent step 37 as to whether the deviation between averages M1 and M2 is plausible on the basis of the control variables that were output. This means, as explained with reference to FIG. 2, that if the deviation is justified, a "Yes" output from query 37 leads to a step 38. A "No" output from query 36 (i.e. difference B is less than the definable threshold value SW) also leads to step 38. The result is to store in control device the information that misfire detection can be performed on the basis of the torque analysis. If the answer to query 37 was "No", however, the conclusion is drawn that a system fault exists, and the misfire detection system is deactivated, as depicted in step 39. In step 40, execution then jumps back to the beginning of said query, and another analysis is performed in the next combustion cycle.

What is claimed is:

1. A method for controlling an ignition in a multi-cylinder internal combustion engine, the multi-cylinder internal combustion engine including a misfire detection system, comprising the steps of:

sensing a parameter of the multi-cylinder internal combustion engine;

determining a control variable for the ignition as a function of the sensed parameter;

initiating a combustion event as a function of the control variable;

sensing a first torque of the combustion event;

comparing the first torque to an average of a plurality of second torques, the plurality of second torques corresponding to a predefined number of previous combustion events; and if a deviation of the first torque from the average of the plurality of second torques is greater than a predefined threshold value, performing the steps of determining whether the deviation is plausible as a function of the control variable, if the deviation is plausible, performing a misfire detection operation, and if the deviation is not plausible, switching the misfire detection system to an inactive status.

2. The method according to claim 1, wherein the step of determining whether the deviation is plausible includes the step of evaluating an ignition timing as a function of a knock control system.

3. The method according to claim 1, wherein the step of determining whether the deviation is plausible includes the step of evaluating an ignition timing as a function of a dynamic phase lead.

* * * * *